United States Patent [19]

Schermer et al.

[11] Patent Number: 5,121,138
[45] Date of Patent: Jun. 9, 1992

[54] RESONANT SCANNER CONTROL SYSTEM

[75] Inventors: Mack J. Schermer, Cambridge; Roger D. Dowd, Watertown, both of Mass.

[73] Assignee: General Scanning, Inc., Watertown, Mass.

[21] Appl. No.: 527,131

[22] Filed: May 22, 1990

[51] Int. Cl.⁵ .............................................. H04N 1/21
[52] U.S. Cl. ................................... 346/108; 358/296
[58] Field of Search .................. 346/108, 107 R, 160; 358/296, 300, 302

[56] References Cited

U.S. PATENT DOCUMENTS

| | | | |
|---|---|---|---|
| 3,900,265 | 8/1975 | Merlen et al. | 356/200 |
| 4,037,231 | 7/1977 | Broyles et al. | 346/108 |
| 4,358,789 | 11/1982 | Confer | 358/140 |
| 4,482,902 | 11/1984 | Bailey et al. | 346/108 |
| 4,797,749 | 1/1989 | Paulsen | 358/302 |
| 4,990,763 | 2/1991 | Shinada | 250/205 |

OTHER PUBLICATIONS

Mecklenburg, "Medical Imaging", Proceedings of Spie—The International Society of Optical Engineering, (1987) vol. 767, pp. 536–542.
Tweed, "Linearizing Resonant Scanners", Lasers & Applications, Aug. 1985, pp. 65–69.

*Primary Examiner*—Mark J. Reinhart
*Attorney, Agent, or Firm*—Cesari and McKenna

[57] ABSTRACT

A resonant scanner control system controls a laser source using a pixel clock which uses a voltage controlled oscillator (VCO) and a phase detector to track continuously throughout the entire scan cycle the pixel-to-pixel and cycle-to-cycle operations of the scanner. The clock includes a VCO which changes frequency in a linear manner in response to changes in a frequency-control voltage applied to it. The VCO includes a negative feedback loop which consists of a frequency-to-voltage converter, which converts the VCO output to a related voltage, and a summing/integrating circuit, which compares this voltage with the frequency-control voltage which is produced in response to pixel related control signals and then integrates the difference. The integrated signal drives the VCO, which produces in response an output signal whose frequency varies linearly with variations in the pixel-related frequency-control signal. Once during each scan cycle the phase detector detects any phase error between a pixel-clock-driven synchronization signal and a position-related synchronization signal, which is produced by an optical detector. If the two synchronization signals do not coincide, the phase detector sends an appropriate analog error signal to a multiplying reference port of a multiplying digital/analog converter (DAC) which produces the pixel related frequency-control signal. The DAC then adjusts its frequency-control signal in accordance with the error signal.

16 Claims, 3 Drawing Sheets

RESONANT SCANNER CONTROL SYSTEM

FIELD OF INVENTION

This invention relates generally to laser printers and more particularly to control circuitry for resonant scanning systems.

BACKGROUND

A high-speed, high-resolution laser printer which is used, for example, for medical image printing, may employ a resonant scanning system. The scanning system directs a laser beam horizontally along each "row" of a stationary print medium, for example, a photographic film, with the beam being selectively pulsed, or turned on, and off, in order to direct light at particular points, or pixels in the row. The pixels receiving the light are recorded as such on the print medium.

The resonant scanners directs the laser beam across each row of pixels using an oscillating mirror. As the mirror oscillates in one direction it directs the beam to successive horizontal, or x-axis, locations, effectively directing the beam to scan across the film. The laser is not operated as the mirror oscillates in the opposite direction, and thus, printing occurs in one direction only. The mirror repeats its oscillations for each row of pixels.

The mirror oscillates in a sinusoidal manner, that is, it begins its oscillation at one side of the film or horizontal axis, speeds up as it directs the beam along the axis toward and past the middle of the film and slows down as it directs the beam to the far side of the film.

In order to print images which are not distorted by the sinusoidal movement of the mirror, as discussed in Mecklenburg, Medical Imaging, Proceedings of the Society of Photo-Optical Instrumentation Engineers (1987), Volume 767 pgs. 536–542, a "non-linear" clock is typically used to time the laser pulses. Specifically, the non-linear clock operates in synchronism with the oscillating mirror such that the laser is pulsed at times which correspond to uniform distance intervals in the row being scanned. The clock rate must thus be proportional to the angular velocity of the mirror. Such a clock is discussed in U.S. Pat. No. 4,541,061 to Schoon.

The Schoon system uses a voltage-controlled oscillator ("VCO") to clock the laser pulses. Basically, the VCO output signal acts as a clock for a pixel counter which generates a count corresponding to the next pixel location with which the laser beam will be aligned. The counter addresses (i) a first memory which contains information relating to the desired image, and (ii) a second memory which contains information relating to the angular velocity of the mirror at the time. The output of the first memory controls the pulsing of the laser, such that it is pulsed each time a dot is desired at the pixel location with which the beam is then aligned. The output of the second memory controls, through a digital-to-analog converter ("DAC"), the frequency-control voltage applied to the VCO. The second memory thus controls the rate at which the counter counts.

The operations of the VCO and the pixel counter are controlled by a scan signal which is asserted and de-asserted at particular points in a "scan cycle." A scan cycle begins with a "write" portion, which is a scan in the direction in which the laser printer writes on the film, and ends with a "return" scan which is a scan across the film in the opposite direction. Specifically, the scan signal is asserted at the start of the write portion of a scan cycle, and it enables operation of the VCO and the pixel counter. The VCO and the counter then operate together to produce clock and laser control signals. When the write portion of the scan cycle is over, the scan signal is de-asserted. This resets the pixel counter and inhibits the VCO, which prevents them from producing the clock and control signals. At the start of the write portion of the next scan cycle, the scan signal is asserted and the VCO and the pixel counter are again enabled.

It is imperative that the write portion of a scan operation begin at the same horizontal position for each line, and that it pulse the laser at the appropriate times to produce dots in the proper horizontal locations. Otherwise, the printed images will be distorted. Thus the operations of the clock and laser control mechanism must be precisely synchronized to the operations of the scanner.

The known prior art system turns the VCO, and thus the clock and laser controller, on and off at the beginning and end of the write portion of a scan cycle, respectively. Accordingly, when the write portion starts the VCO must be re-synchronized. The system may re-start the VCO when a detector detects the start of the write portion of the scan cycle. The VCO then synchronizes, over a period of time, to the frequency of the scanner. Alternatively, the system may include a separate VCO re-synchronization clock whose frequency is many times faster than the resonant frequency of the scanner. When the VCO turns on at the start of the write portion of the scan cycle, it synchronizes to the frequency of the re-synchronization clock. The VCO output signal is then fed to a divider circuit which generates the smaller clock for the pixel counter. Such a re-synchronization clock is both costly and difficult to build because it must run many times faster than the fastest clock signal required to drive the pixel counter. Further, the re-synchronization clock must continuously stay in synchronism with the scanner. Regardless of which synchronization mechanism the system uses, the system still requires synchronization of the VCO at the start of the write portion of each scan cycle. Accordingly, the system may produce distorted images while the VCO is synchronizing.

Distortion may occur, also, if the VCO produces an output frequency which is not linearly related to the applied frequency-control voltage. This may occur, for example, if the VCO is subjected to changes in ambient temperature. This non-linearity adversely affects the timing of the clock and control signals applied to the rest of the system.

SUMMARY

The invention is a resonant scanner control system which controls a laser source using a pixel clock which tracks the pixel-to-pixel and cycle-to-cycle operations of the scanner.

The pixel clock includes a voltage-controlled oscillator ("VCO") which uses negative feedback to produce a clock frequency which is linearly related to the frequency-control signal applied to the oscillator. Specifically, the oscillator output is applied to a frequency-to-voltage converter. The output of this converter is compared with a frequency-control voltage produced in response to pixel-related control signals and the difference between these voltages is an error signal that is integrated and applied to the frequency-control terminal of the VCO. The VCO output, which is thus linearly related to the frequency-control voltage, is applied to a laser controller as a clock signal.

Furthermore, the VCO signal clocks a pixel address counter. The counter addresses a memory which contains information relating pixel locations to the angular velocity of the oscillating mirror. The memory sends the stored information to the VCO through a digital-analog converter (DAC) whose output is the frequency-control voltage and the VCO adjusts its frequency accordingly.

The memory also produces, through a delay or latch, a scan synchronization signal. The scan synchronization signal is applied to a phase error detector, which detects the difference between the occurrence of this signal and another synchronization signal which is produced during each scan cycle at a predetermined time, for example, at the start of each scan cycle. If the two synchronization signals do not coincide, the phase detector sends a phase error signal to the DAC. The DAC then adjusts its output by multiplying it by a factor which is related to the phase error. This forces the VCO to adjust the frequency of its output signal by the same phase-related factor, and, in so doing, it effectively adjusts the phase of the pixel clock.

The VCO operates during the entire scan cycle, that is, while the mirror is oscillating in both directions. Thus the VCO need not be re-started and completely re-synchronized at the start of each scan cycle. Accordingly, it readily tracks frequency changes in the resonant scanner. The laser pulses are thus precisely synchronized to the operations of the scanner.

In order to produce uniform recording intensities across the recording medium, for example, uniform shades of gray at various pixel locations, the system must be capable of exposing each of the pixels to the same amount of laser energy. Specifically, the laser output power must be precisely controlled so that the laser power is less at the end of a line, when the beam-directing mirror is moving relatively slowly and the beam is directed to the pixel location for a relatively long period of time, and more power for pixels in the center of a line, when the mirror is moving quickly. The system uses the frequency-control signal for the VCO to control the laser output power. The laser output power is thus linearly related to the mirror velocity.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
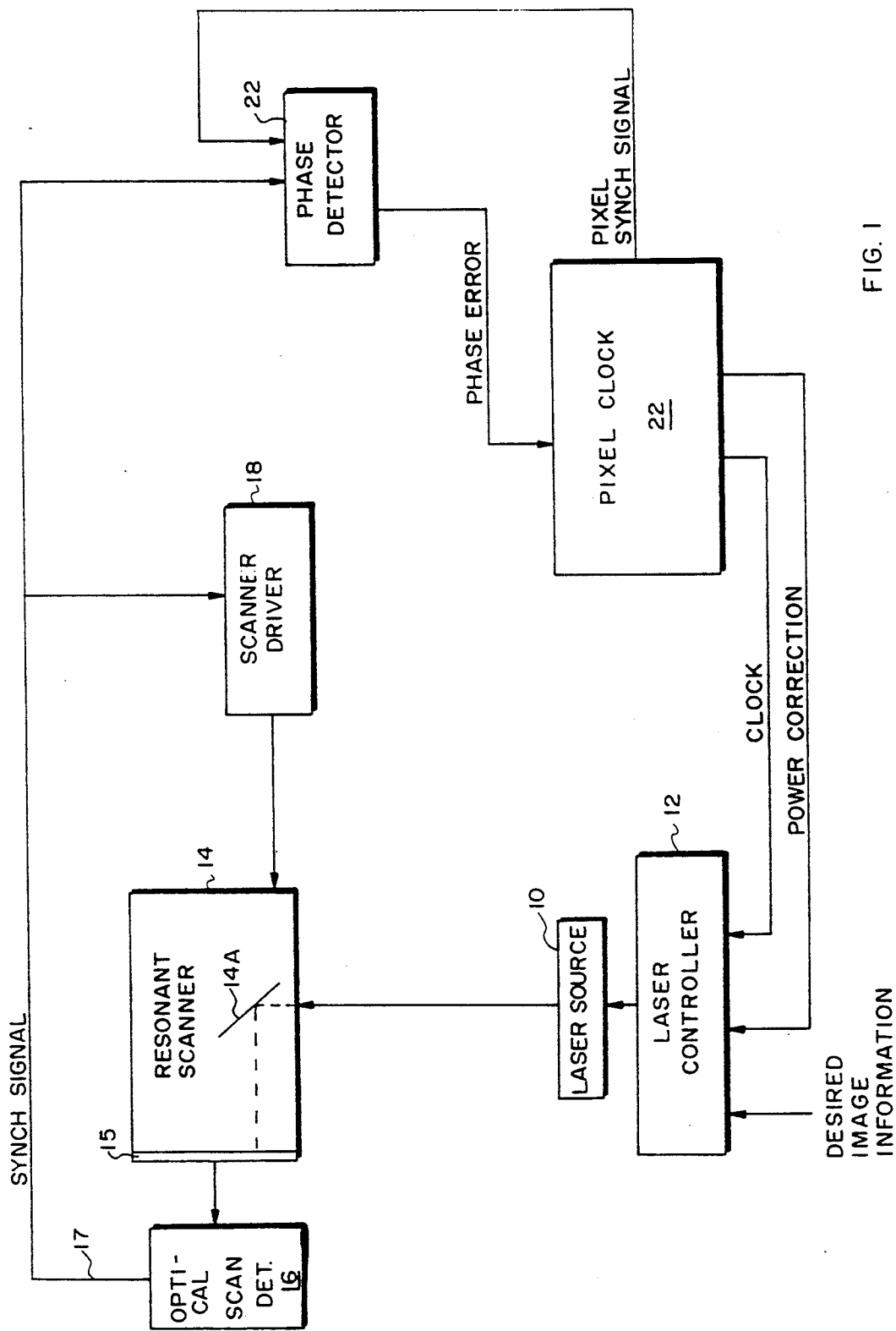
FIG. 1 is a block diagram of a resonant scanner system constructed in accordance with the invention.

FIG. 1 depicts a resonant scanner system which includes a laser source 10, a laser controller 12, a resonant scanner 14, an optical scan detector 16, a scanner driver 18, a pixel clock 22 and a phase detector 20. The various components operate together over a number of scan cycles to print a desired image on print medium, such as film 15.

Specifically, the controller 12 pulses the laser 10 to produce laser beam pulses. These pulses are reflected by an oscillating mirror 14a to direct the laser beam across each "row" of the film 15. The laser controller 12, which receives clock and power control signals from the pixel clock 22, controls the pulsing of the laser 10 to print dots at various horizontal locations, or pixels, in accordance with supplied image information.

Figure 2:
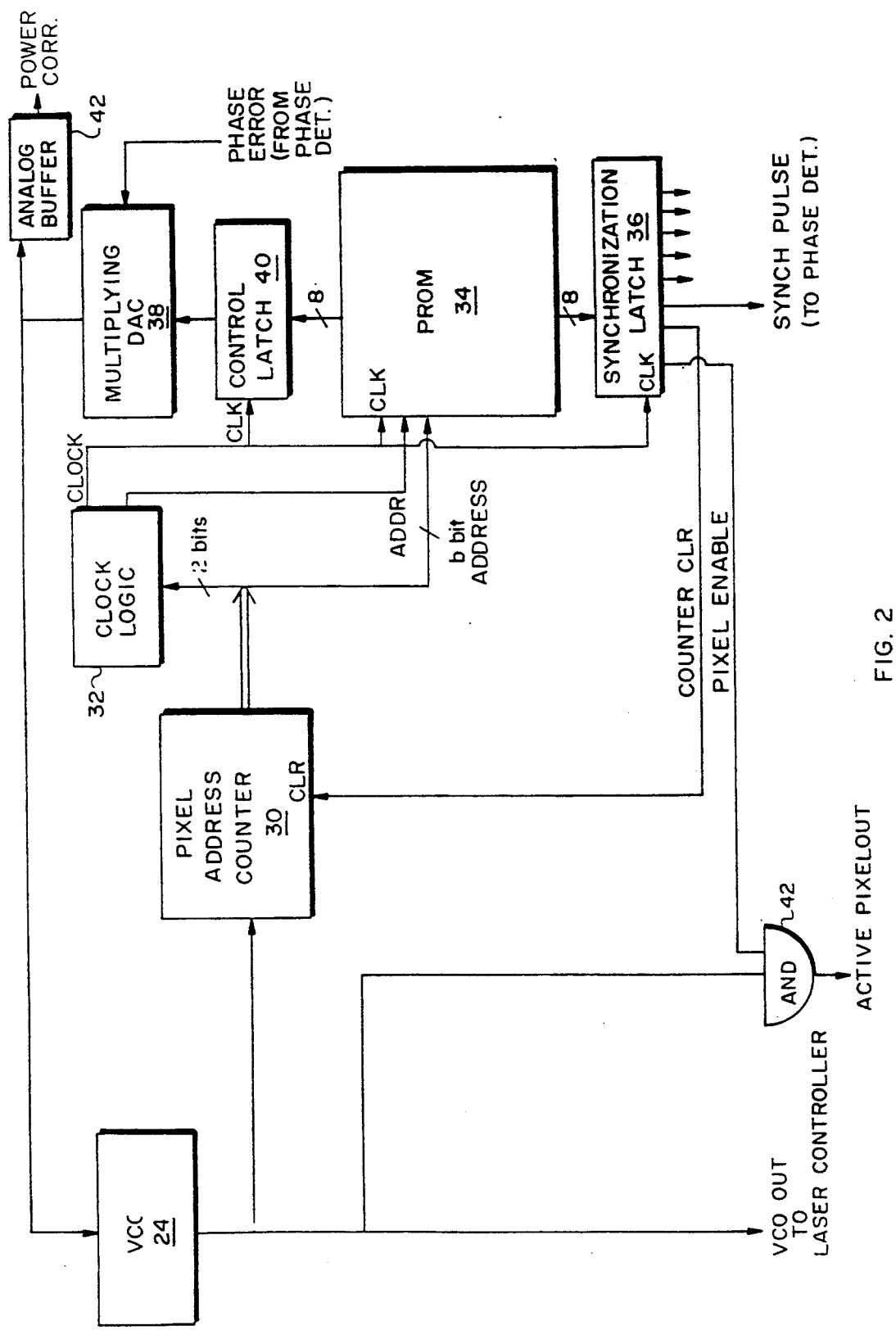
FIG. 2 is a block diagram of a pixel clock shown in FIG. 1.

The pixel clock 22, which is described in more detail below with reference to FIG. 2, is synchronized to the oscillations of the mirror 14a. The optical scan detector 16 is positioned to detect a laser pulse from the mirror 14a at a predetermined point in each scan cycle, for example, at the beginning of the cycle. The detector transmits a corresponding signal to the scanner driver 18 and the phase detector 22.

The scanner driver 18 uses the synchronization signal to maintain the proper amplitude of the current that drives the scanner 14. The phase detector 22 compares the phase of this synchronization signal with the phase of a synchronization signal produced by the pixel clock 22. If the two synchronization signals do not coincide, the phase detector 22 produces a phase-error signal which it transmits to the pixel clock 22. The pixel clock 22 uses this error signal to maintain synchronization with the oscillations of the scanner mirror 14a, as discussed in more detail below.

The phase detector 20 in the current embodiment has a bandwidth which is approximately one-tenth the resonant frequency of the scanner 14. Thus the phase detector 20 does not respond to changes in resonant frequency of the scanner 14 which affect only one scan cycle, for example, changes caused by jitter. Instead, it responds to changes which persist over a substantial number of scan cycles, such as changes due to differences in ambient temperature.

As previously discussed, the angular velocity of the mirror 14a varies with position. Specifically, the angular velocity of the mirror 14a is less at the ends of its oscillation than at the center. Thus in order to expose each pixel to the same laser energy, the system must decrease the output power of the laser when the mirror is moving relatively slowly and increase the power when the mirror is moving quickly. This enables the system to produce images with uniform gradations of color, for example, uniform shades of gray, at different positions across the recording medium. The pixel clock 22, which operates in synchronism with the scanner 14 and the oscillations of the mirror 14a, provides to the laser controller 12 a power correction signal which is used to adjust the laser output power, as discussed in more detail below.

FIG. 2 depicts the pixel clock 22 of FIG. 1 in more detail. The pixel clock 22 includes a digital-to-analog converter ("DAC") 38, a pixel address counter 30, a PROM 34 which stores information relating to various pixel locations, a VCO 24, synchronization latch 36 and a control latch 40. The pixel clock 22 also includes an AND gate 42 which asserts an ACTIVE PIXEL OUT signal when it receives from synchronization latch 40 an asserted PIXEL ENABLE signal indicating the start of the write portion of a scan cycle.

At the start of a scan cycle the pixel address counter 30 starts to count clock pulses from the VCO 24. The count contained in the counter 30 is applied to the PROM 34 and a clock 32. The "b" most significant bits of the count are sent to the PROM 34 as an address and the two least significant bits are sent to the clock 32.

The clock 32 in turn sends a clock signal to the latches 36 and 40, and the clock signal and a one-bit ADDR signal to the PROM 34. The PROM 34 uses this one-bit ADDR signal as the most significant address bit. The ADDR signal thus dictates which half of the PROM 34 is addressed at any given time.

The PROM 34 in the preferred embodiment contains information that is loaded into the synchronization and the control latches 36 and 40. One half of the PROM 34, for example, the half addressed by signals with the ADDR signal asserted, contains information for the synchronization latch 40. This is the information which is used by the system to maintain synchronization between the pixel clock 22 and the scanner 14, that is, cycle-to-cycle synchronization. The other half of the PROM 34, which is addressed by signals with the ADDR signal de-asserted, contains information for the control latch 36. This is the information which is used by the system to maintain synchronization between the pixel clock 22 and the angular velocity of the oscillating mirror 14a (FIG. 1), that is, pixel-to-pixel synchronization.

The PROM 34 contains control and synchronization information for every $n^{th}$ pixel location, with n=4 in the preferred embodiment. Each time the PROM 34 is clocked it sends either control or synchronization information to one of the latches 36 or 40. However, the PROM 34 sends the same information to each latch 36 or 40 at least twice. That is, the PROM 34 receives only twelve of the most significant bits of a fourteen- or sixteen-bit pixel count, with the two least significant bits, the bits which change every count, going to the clock logic 32. The clock logic 32 uses these bits to assert and de-assert the one-bit ADDR signal, while the remaining address bits change only every fourth clock signal.

The control latch 40 receives pixel related information from the PROM 34 every other clock pulse. The multiplying DAC 38 uses the information and the error signal from the phase detector 20 (FIG. 1) to generate the frequency-control voltage which it sends to the VCO 24. In particular, the DAC 38 multiplies the signals it receives from the control latch 40 by a factor corresponding to phase error, if any, of the VCO 24. The output of the DAC 38 thus adjusts the frequency of the VCO 24 not only to vary the pulse rate of the laser 10, as described, but also to synchronize it to the oscillations of the mirror 14a (FIG. 1).

The VCO 24 responds in a predetermined manner to the control voltage from the DAC 38. That is, produces a clock signal at a frequency which is linearly related to the control voltage, as discussed in more detail below with reference to FIG. 3.

When the pixel address counter reaches a count which corresponds to the point in the scan cycle at which an asserted pixel synchronization signal is to be sent to the phase error detector 20 (FIG. 1), the PROM 34 sends to the synchronization latch 36 information which causes it to transmit a PIXEL ENABLE OUT signal. Later, at the end of the write portion of the scan cycle, the synchronization latch 36 receives from the PROM 34 information which causes it to de-assert its signal. Finally, at the end of each scan cycle, the synchronization latch 36 receives information from the PROM 34 which causes it to clear the pixel address counter 22 in preparation for the next scan cycle. Shortly thereafter, at the start of the write portion of the next scan cycle, the synchronization latch 36 receives information which causes it to re-assert the PIXEL ENABLE OUT signal.

The VCO output signal, which clocks the pixel counter for each pixel, has a frequency that varies directly with the output voltage of the DAC 38. Accordingly, the DAC output voltage may be used to control the output power of the laser to achieve uniform exposure for each pixel. The DAC output is thus fed to an analog buffer 42 which applies a power correction signal to the laser controller 12 (FIG. 1) to control the output power of the laser such that each pixel receives a desired amount of laser energy. For example, if the laser beam is aligned with a pixel in the center of a row where the mirror velocity is at its maximum, the signal from the analog buffer directs the laser to apply maximum output power for any dots to be recorded there. In this way, the pixel receives the same total energy as a pixel year the end of a row where the velocity is at a minimum and the laser power is correspondingly lower.

Figure 3:
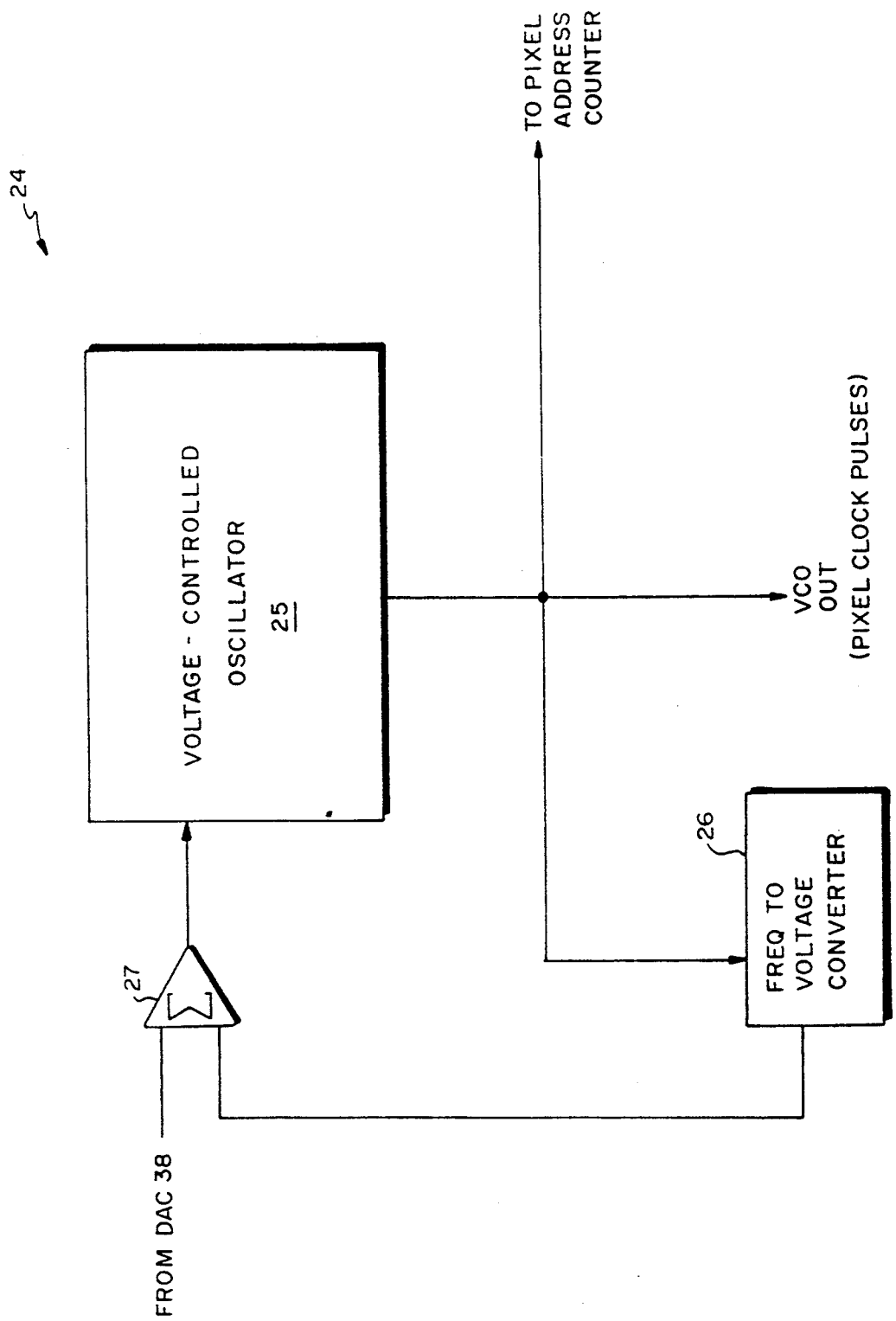
FIG. 3 is a block diagram of a voltage-controlled oscillator shown in FIG. 2.

FIG. 3 depicts in detail the VCO 24 of FIG. 2 which, as discussed above, changes frequency in a linear manner in response to changes in the frequency-control voltage from the DAC 38. The VCO 24 includes a conventional voltage-controlled oscillator 25 and a negative feedback loop comprised of a frequency-to-voltage converter 26 and a summing and integrating circuit 27. The oscillator 25 applies its output signal to the converter 26, and the converter produces a corresponding voltage which is proportional to the oscillator frequency. The summing and integrating circuit 27 subtracts this voltage from the DAC 38 output voltage, i.e. the frequency-control voltage for the VCO, and integrates the difference. The resulting error signal drives the oscillator 25, which thus produces a signal whose frequency varies linearly with variations in the DAC output voltage.

The foregoing description has been limited to a specific embodiment of this invention. It will be apparent, however, that variations and modifications may be made to the invention, with the attainment of some ore all of its advantages. Therefore, it is the object of the appended claims to cover all such variations and modifications as come within the true spirit and scope of the invention.

What is claimed is:

1. A control system for a laser printer which utilizes a resonant scanner, said system comprising:
   A. a laser source for producing a pulsed laser beam, the laser beam printing dots on a printing medium surface;
   B. a resonant scanner including an oscaillating mirror that directs the laser beam across the surface of the printing medium in order to expose successive pixel locations to the laser beam, each complete mirror oscillation corresponding to a scan cycle;
   C. a controller for controlling the pulsing of the laser source in accordance with a selected image and in synchronism with a laser periodic pulse timing signal; and
   D. synchronizing means for synchronizing the period of the laser pulse timing signal with the angular movement of the mirror, the synchronizing means continuously throughout the entire scan cycle adjusting the frequency of the laser pulse timing signal according to (i) changes in the angular velocity of the mirror and (ii) changes in the resonant frequency of the resonant scanner.

2. The control system of claim 1, wherein the synchronizing means includes:
   A. a memory for storing mirror velocity information relating to the pixels in locations addressable by a pixel count;
   B. counting means for generating memory addresses corresponding to selected pixel locations and supplying the addresses to the memory;
   C. converting means connected to receive the information contained in an addressed memory location, the converting means generating a control voltage which corresponds to the information; and
   D. voltage-controlled oscillating means connected to receive the control voltage, the oscillating means adjusting its frequency in accordance with the control voltage and supplying its output signal to (i) the controller as the laser pulse timing signal, and (ii) the counting means to synchronize the operations of the counting means to the angular movement of the mirror throughout the entire scan cycle.

3. The control system of claim 2, wherein the system further includes:
   A. a phase error detector for detecting phase timing differences between a signal associated with a predetermined angular position of the mirror and a signal associated with a predetermined count of the counting means, the detector producing an analog error signal corresponding to the timing difference; and
   D. a multiplying means included in the converting means, the multiplying means multiplying the control voltage by a factor which corresponds to the error signal so as to reduce the timing difference.

4. The control system of claim 2, wherein the voltage-controlled oscillating means includes:
   A. a frequency-to-voltage converter for producing an output voltage which corresponds to the frequency of the voltage-controlled oscillating means output signal; and
   B. means for comparing the control voltage produced by the converting means and the frequency-to-voltage converter output voltage and producing a resulting error signal which corresponds to the difference;
   the oscillating means using this signal as a frequency-control voltage and adjusting its output signal so as to produce an output signal at a frequency which is linearly related to the control voltage.

5. The control system of claim 4 wherein the comparing means includes an integrating means for integrating the difference to produce the resulting error signal, the resulting error signal varying linearly with the control voltage.

6. The control system of claim 3, wherein the voltage-controlled oscillating means includes:
   A. a frequency-to-voltage converter for producing an output voltage which corresponds to the frequency of the voltage-controlled oscillating means output signal; and
   B. means for comparing the control voltage produced by the converting means and the frequency-to-voltage converter output voltage and producing a resulting error signal which corresponds to the difference;
   the oscillating means using this signal as a frequency-control voltage and adjusting its output signal so as to produce an output signal at a frequency which is linearly related to the control voltage.

7. The control system of claim 6, wherein the comparing means includes an integrating means for integrating the difference to produce the resulting error signal, the resulting error signal varying linearly with the control voltage.

8. The control system of claim 4, wherein the system further includes a power control means for controlling the output power of the laser source, the power control means connected to receive the control signal produced by the converting means and produce in response thereto a power control signal which operates to control the output power of the laser in synchronism with the angular movement of the mirror.

9. The control system of claim 6, wherein the system further includes a power control means for controlling the output power of the laser source, the power control means connected to receive the control signal produced by the converting means and produce in response thereto a power control signal which operates to control the output power of the laser in synchronism with the angular movement of the mirror.

10. A control system for a laser printer which utilizes a resonant scanner, said system comprising:
   A. a laser source for producing a pulsed laser beam, the laser beam printing dots on a printing medium surface;
   B. a resonant scanner including an oscillating mirror that directs the laser beam across the surface of the printing medium in order to expose successive pixel locations to the laser beam, each complete mirror oscillation corresponding to a scan cycle;
   C. a controller for controlling the pulsing of the laser source in accordance with a selected image and in synchronism with a periodic laser pulse timing signal;
   D. synchronizing means for synchronizing the period of the laser pulse timing signal with the angular movement of the mirror, the synchronizing means adjusting the frequency of the laser pulse timing signal in response to changes in the angular velocity of the mirror and changes in the resonant frequency of the resonant scanner, the synchronizing means including:
      i. a memory for storing mirror velocity information relating to the pixels in locations addressable by a pixel count;
      ii. counting means for generating memory addresses corresponding to selected pixel locations and supplying the addresses to the memory;
      iii. converting means connected to receive the information contained in an addressed memory location, the converting means generating a control voltage which corresponds to the information;
      iv. voltage-controlled oscillating means connected to receive the control voltage, the oscillating means adjusting its frequency in accordance with the control voltage and supplying its output signal to (i) the controller as the laser pulse timing signal and (ii) the counting means to synchronize the operations of the counting means to the angular movement of the mirror;
      v. a phase error detector for detecting timing differences between a signal associated with a predetermined angular position of the mirror and a signal associated with a predetermined count of the counting means, the detector producing an error signal corresponding to the timing difference; and vi. multiplying means included in the converting means, the multiplying means multiplying the control voltage by a factor which corresponds to the error signal so as to reduce the timing difference.

11. The control system of claim 10, wherein the synchronization means operates continuously throughout the entire scan cycle to adjust the frequency of the laser pulse timing signal.

12. The control system of claim 11, wherein voltage-controlled oscillator includes:

A. a frequency-to-voltage converter for producing an output voltage which is associated with the frequency of the voltage-controlled oscillating means output signal; and B. means for comparing the multiplied control voltage and the frequency-to-voltage converter output voltage and producing a resulting error signal which corresponds to the difference;

the oscillating means using this signal as a frequency-control voltage and adjusting its output signal so as to produce an output signal at a frequency which is linearly related to the control voltage.

13. The control system of claim 12, wherein the comparing means includes an integrating means for integrating the difference to produce the resulting error signal, the resulting error signal varying linearly with the control voltage.

14. A control system for a laser printer which utilizes a resonant scanner, said system comprising:

A. a laser source for producing a pulse laser beam, the laser beam printing dots on a printing medium surface;

B. a resonant scanner including an oscillating mirror that directs the laser beam across the surface of the printing medium in order to expose successive pixel locations to the laser beam, each complete mirror oscillation corresponding to a scan cycle;

C. a controller for controlling the pulsing of the laser source in accordance with a selected image and in synchronism with a periodic laser pulse timing signal;

D. synchronizing means for synchronizing the period of the laser pulse timing signal with the angular movement of the mirror, the synchronizing means continuously throughout the entire scan cycle adjusting the frequency of the laser pulse timing signal according to changes in the angular velocity of the mirror and changes in the resonant frequency of the resonant scanner the synchronizing means including a voltage-controlled oscillating means connected to receive a pixel-related frequency-control voltage, the oscillating means adjusting its frequency in accordance with the frequency-control voltage and supplying its output signal to the controller as the laser pulse timing signal to synchronize the operations of the controller to the angular movement of the mirror, the voltage-controlled-oscillating means including:

i. a frequency-to-voltage converter for producing a voltage which is associated with the frequency of the voltage-controlled oscillating means output signal; and ii. comparing means for comparing the output of the frequency-to-voltage converter and the frequency-control voltage and producing a resulting error signal which relates to the difference; the oscillating means using the resulting error signal as the oscillator control voltage and adjusting its output signal so as to produce an output signal at a frequency which is linearly related to the control voltage.

15. The control system of claim 14, wherein the comparing means includes an integrating means for integrating the difference to produce the resulting error signal, the resulting error signal varying linearly with variations in the frequency-control voltage.

16. The control system of claim 15, the system further including:

E. a phase error detector for detecting timing differences between a signal associated with a predetermined angular position of the mirror and a signal associated with a predetermined count of the counting means, the detector producing an error signal corresponding to the timing difference; and F. multiplying means for multiplying a pixel-related control voltage by a factor which corresponds to the error signal to produce the frequency-control voltage and supplying this voltage so as to reduce the timing difference.

* * * * *